United States Patent [19]

Nichols

[11] Patent Number: 4,995,588
[45] Date of Patent: Feb. 26, 1991

[54] DRY-BREAK DISCHARGE VALVE ASSEMBLY FOR A LIQUID BULK CONTAINER

[75] Inventor: Dwight E. Nichols, Beatrice, Nebr.

[73] Assignee: Hoover Group, Inc., Alpharetta, Ga.

[21] Appl. No.: 435,728

[22] Filed: Nov. 13, 1989

[51] Int. Cl.$^5$ ............................................. F16K 51/00
[52] U.S. Cl. ..................................... 251/144; 251/339
[58] Field of Search ................ 251/339, 144; 137/223, 137/234.5

[56] References Cited

U.S. PATENT DOCUMENTS

| | | | |
|---|---|---|---|
| 1,453,721 | 5/1923 | Norwalk | 137/234.5 |
| 1,928,070 | 9/1933 | Moore | 137/223 |
| 4,014,365 | 3/1977 | Peterson et al. | 251/339 |
| 4,015,819 | 4/1977 | Zahid | 251/339 |
| 4,133,345 | 1/1979 | Mitchell | 251/339 |
| 4,707,279 | 11/1987 | Walls | 251/339 |

FOREIGN PATENT DOCUMENTS 1195134 11/1959 France ................................ 137/223

Primary Examiner—A. Michael Chambers
Attorney, Agent, or Firm—Harness, Dickey & Pierce

[57] ABSTRACT

A dry-break discharge valve assembly for use in connection with liquid bulk containers which includes a valve and a valve housing. The valve housing includes an inner lining member having an upper valve seat, and a lower shoulder portion. The valve is movable between a closed position in the housing seated on the valve seat, and an upwardly moved open position. The valve has a stem with a lower portion which is secured by a retaining pin to a retaining member and a spring is disposed within the housing between the shoulder portion and the retaining member so as to urge the valve toward its seated position, thereby creating a leak-proof seal. The valve may be opened by directing an upward force against the lower portion of the valve stem and urging the valve upwardly away from the valve seat. Wings or fins on the valve stem engage the lining member to guide the up and down movement of the valve.

3 Claims, 2 Drawing Sheets

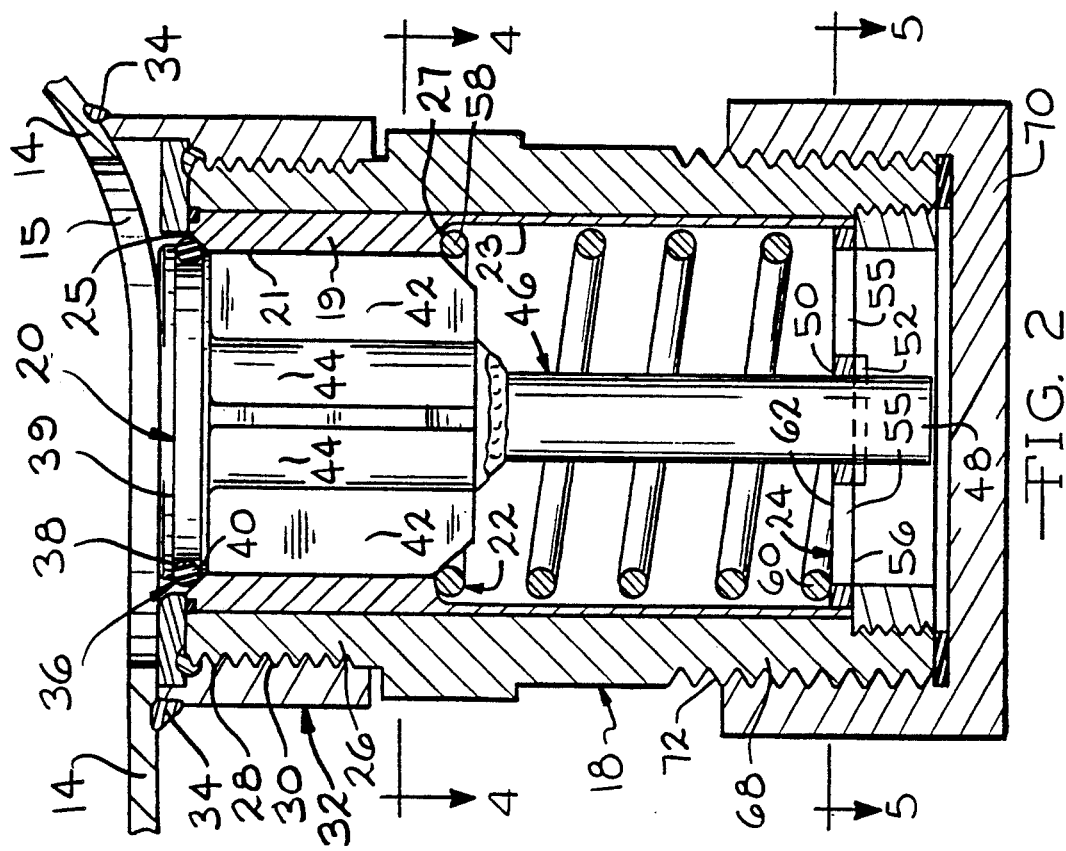
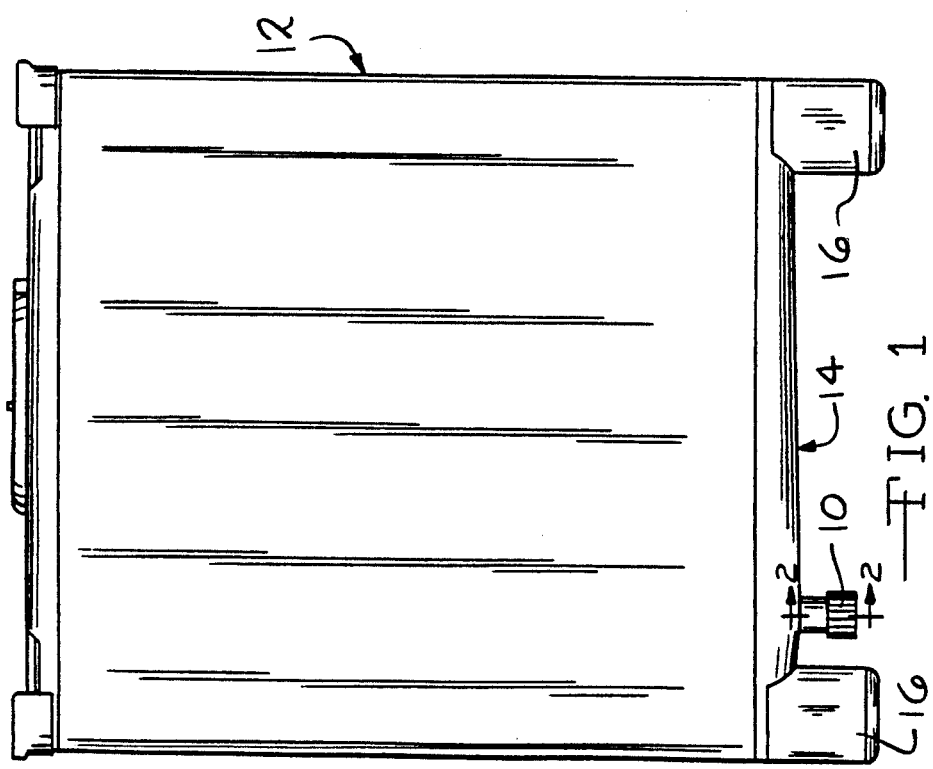

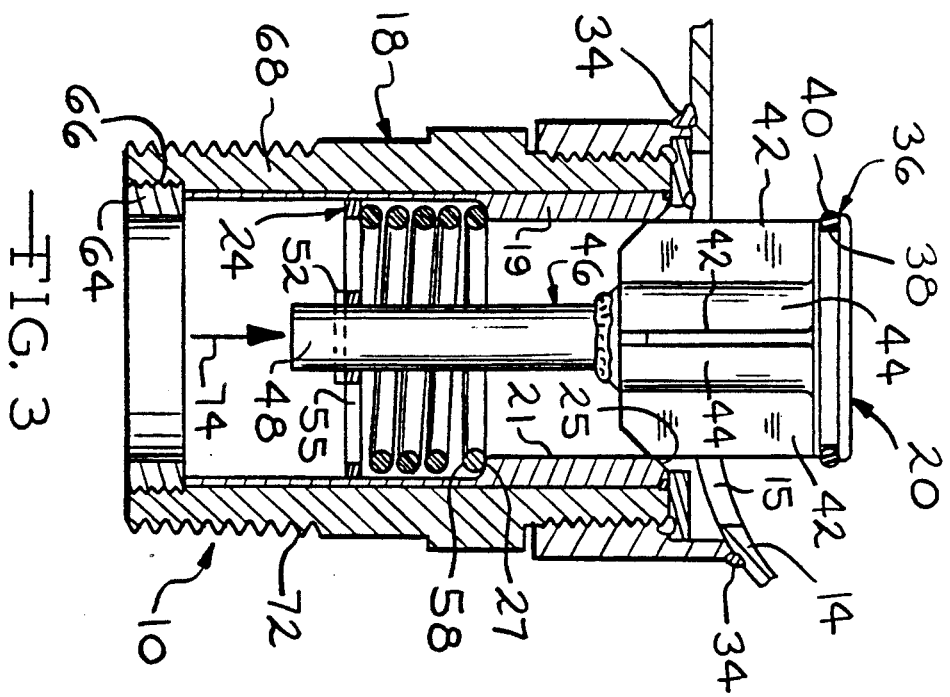
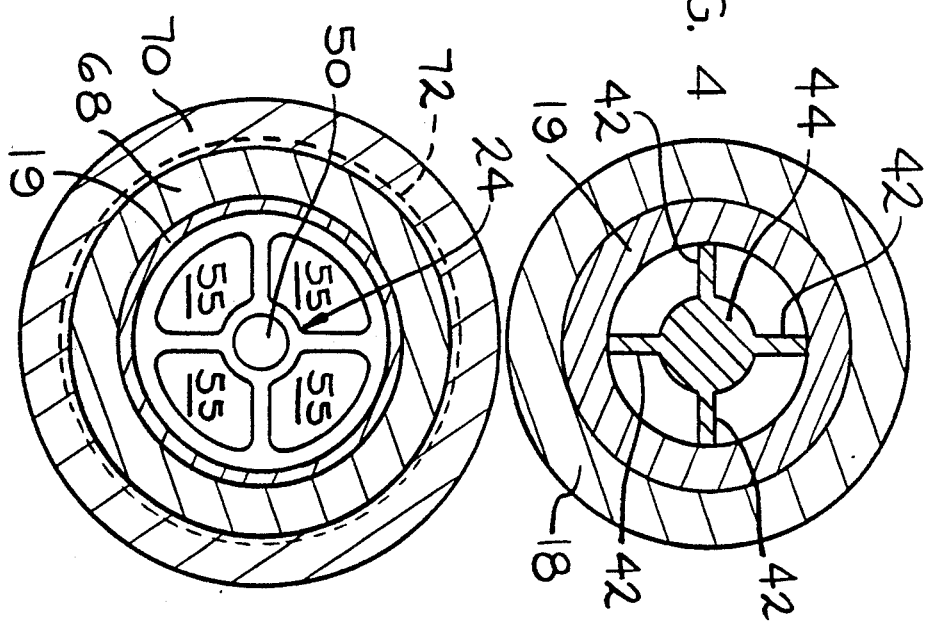

DRY-BREAK DISCHARGE VALVE ASSEMBLY FOR A LIQUID BULK CONTAINER

BACKGROUND OF THE INVENTION

1. Technical Field

This invention relates to valve assemblies and, more particularly, to a dry-break discharge valve assembly for use in connection with liquid bulk containers.

2. Discussion

Valve assemblies are useful in a wide variety of applications where the flow of liquids must be controlled or quickly interrupted. In particular, discharge valves are useful when used in connection with liquid bulk containers. Such containers typically may store up to 350 gallons or more of liquid material. Due to their large size and weight, such containers are not easily tipped or otherwise turned upside down for drainage purposes. As such, a discharge valve located at or near the bottom of such a container is necessary to enable such a container to be drained quickly and easily without having to tilt or tip the container at various angles to accomplish drainage of its contents. An example of a liquid bulk container is disclosed in U.S. Pat. No. 4,840,284, to Snyder, issued June 20, 1989, assigned to the assignee of the present invention.

Since liquid bulk containers are not easily drained by means other than a valve at or near their bottom or base portions, it becomes important to have a valve assembly that provides a leak-proof seal. A discharge valve which leaks could seriously compromise the efficiency of a liquid bulk container since such a container might have to be immediately drained or other measures taken to control the leakage, thereby interfering with transportation or storage of the container.

It it therefore a principal object of the present invention to provide a valve assembly capable of providing a leak-proof seal for the contents of a liquid bulk container.

It is a further object of the present invention to provide a valve assembly which is capable of being opened and closed quickly and easily in the event that a discharge of the contents of such a container must be quickly interrupted.

It is still a further object of the present invention to provide a discharge valve which is operable to remain in a normally closed position, thereby removing the possibility of the discharge valve being left inadvertently in the open position.

It is still a further object of the present invention to provide a valve assembly which may be manufactured relatively easily and inexpensively, and which is capable of being disassembled for periodic cleaning.

It is a further object of the present invention to provide a valve assembly which may be removed quickly and easily from its associated liquid bulk container to help facilitate cleaning of the valve assembly.

Yet another object of the invention is to provide a valve assembly in whcih the valve member is flush with the tank bottom wall to thereby eliminate any space in which material from the tank could be isolated and thereby prevent thorough mixing.

SUMMARY OF THE INVENTION

The above and other objects are provided by a dry-break discharge valve assembly in accordance with the present invention. The valve assembly includes a valve having shoulder and stem portions and being movable between open and closed positions. The valve further includes a sealing ring disposed about a periphery of the shoulder portion to help facilitate a leak-proof seal when the valve is in the closed position. The valve is disposed within a housing having an upper inner wall and a lower, recessed inner wall. The upper inner wall forms a seat portion operable to help form a leak-proof seal in cooperation with the sealing ring of the valve shoulder when the valve is in the closed position. A biasing member having first and second ends is disposed coaxially within the housing along the recessed inner wall and in abutting contact with a shoulder portion formed by the recessed inner wall. The biasing member operates to provide a biasing force to help hold the valve in the closed position.

Further included in the valve assembly is a retaining member having at least one aperture. The retaining member is secured to the stem of the valve and abuttingly contacts the second end of the biasing member. The retaining member uses the biasing force generated by the biasing member to urge the shoulder portion of the valve against the seat portion, thereby providing a leak-proof seal between the seat of the shoulder portion of the valve and the valve shoulder, and placing the valve in the closed position. The valve is movable to the open position by urging the stem of the valve inward relative to the seat portion of the housing to thereby move the shoulder portion of the valve off of the seat portion, thereby allowing liquid to flow through the housing and the aperture in the retaining member.

In a preferred embodiment, the valve assembly further includes a plurality of outwardly protruding fins protruding from an upper portion of the valve stem and spaced circumferentially around the upper portion of the valve stem in a uniform fashion. The fins operate to hold the valve concentrically within the upper inner wall of the housing when the valve is forcibly urged into the open position.

BRIEF DESCRIPTION OF THE DRAWINGS

The various advantages of the present invention will become apparent to one skilled in the art by reading the following specification and subjoined claims and by referencing the following drawings in which:

FIG. 1 is a side elevational view of a liquid bulk container equipped with the dry-break discharge valve assembly of the present invention;

FIG. 2 is a partial side elevational view of the discharge valve of FIG. 1 taken along section lines 2—2 of FIG. 1 showing the valve assembly of the present invention in partial elevation and in a generally closed position;

FIG. 3 is an enlarged, partial side sectional view of the valve assembly of the present invention showing the valve in elevation and in a generally open position;

FIG. 4 is a sectional plan view of the valve assembly of the present invention taken along section lines 4—4 of FIG. 2; and FIG. 5 is a sectional view of the valve assembly of the present invention taken along section lines 5—5 of FIG. 2.

DETAILED DESCRIPTION OF THE PREFERRED EMBODIMENTS

A dry-break discharge valve assembly 10 in accordance with the present invention is shown in FIG. 1 in assembly relation with a liquid bulk container 12. The valve assembly 10 is secured to a sloped bottom structure 14 of the container 12 having an opening 15 (shown in FIG. 2) therein for allowing liquid to be drained from the container 12. The sloped bottom structure 14 facilitates more complete drainage of the contents of the container 12. Further included with the container 12 are a plurality of feet 16 for maintaining the container 12 in an upright fashion and for providing room underneath the container 12 for operating the valve assembly 10.

It should be understood that the foregoing is only intended as a general overview of a container with which the present invention may be used. Specific details of the construction of a suitable liquid bulk container may be found in U.S. Pat. No. 4,840,284, the disclosure of which is hereby incorporated by reference.

The valve assembly 10 generally comprises an annular valve housing 18, a valve 20, a spring 22 and a retaining member 24, as shown in FIGS. 2 and 3. The valve housing 18 has a first end 26 having a threaded portion 28. The threaded portion 28 is adapted to threadably engage with a threaded portion 30 of a downwardly protruding, annular mounting member 32 shown in FIG. 2. Mounting member 32 is secured to the sloped bottom structure 14 preferably by welds 34 and allows the housing 18 to be threadably removed from the container 12 to help facilitate periodic cleaning of the valve assembly 10.

The valve housing 18 further includes a concentrically disposed inner sleeve member or portion 19 having an upper inner wall 21 and a lower, recessed inner wall 23. A portion of the upper inner wall 21 forms an angled valve seat 25 upon which the valve 20 forcibly rests to form a leak-proof seal. A portion of the recessed inner wall 23 forms a shoulder 27, the function of which will be explained shortly.

The valve 20 has an upwardly facing head portion 39 and an annular shoulder 36 formed by an annular groove 38 located below the head portion 39. An annular sealing ring 40 is formed of a rubber or rubber-like material and is frictionally supported on the valve 20 within the groove 38. The valve 20 further includes a plurality of outwardly protruding fins 42 integrally formed with an upper portion 44 of an elongated stem 46 of the valve 20. The fins 42 are disposed uniformly and circumferentially around the upper portion 44 of the valve stem 46 and operate to help hold the valve 20 concentrically aligned within the inner sleeve 19 when the valve 20 is in an open position, as illustrated in FIG. 3.

The valve stem 46 further has a lower portion 48 which extends concentrically through an annular opening 50 disposed concentrically within the retaining member 24. A retaining pin 52 is disposed orthogonal to the lower portion 48 of the valve stem 46 through an opening defined by hidden lines 54 in the lower portion 48 of the valve stem 46. The retaining pin 52 is operable to abuttingly contact a lower surface 56 of the retaining member 24, thus enabling retaining member 24 to slidably move the valve 20 to the generally closed position shown in FIG. 2. The retaining member 24 further includes a plurality of apertures 55 to allow the liquid contents of the container 12 to pass therethrough when the valve 20 is in the open position.

The spring 22 is of a diameter which allows it to rest within and along recessed inner wall 23. The spring 22 further has a first end 58 which is adapted to abuttingly engage with the shoulder 27 of the recessed inner wall 23, and a lower end 60 adapted to abuttingly contact the outer periphery of an upper surface 62 of the retaining member 24. The shoulder portion 27 of the recessed inner wall 23, the retaining member 24 and the retaining pin 52 thus cooperatively enable the spring 22 to exert a downward biasing force on the valve 20 to hold the valve 20 in a normally closed position as generally shown in FIG. 2.

A threadably removable lower retaining member 64 may also be included in the valve assembly 10 for helping to positively limit the downward travel of the valve 20 and to control the force exerted on the sealing ring 40 by the spring 22 when the valve 20 is in the closed position. The lower retaining member 64 is adapted to threadably engage with a threaded portion 66 of a lower portion 68 of the housing 18. A threadably removable end cap 70 may also be included to further help insure against leakage of the contents of the container 12. The end cap 70 is adapted to threadably engage with exterior threads 72 of the lower portion 68 of the housing 18 and provides a second seal required by the Department of Transportation when transporting a container such as container 12.

The housing 18 of the valve assembly 10 may be made from a wide variety of materials but preferably will be made from metal for the purposes of strength and durability. The valve 20, inner sleeve 19, retaining member 24, lower retaining member 64 and the end cap 70 will all likewise preferably be made from metal or a similar material having good strength and durability.

When the valve 20 is in the closed position sealing ring 40 will be forcibly held against the valve seat 25 by the downward biasing force of the spring 22. Therefore, the liquid contents of the container 12 will be obstructed from entering the valve housing 18 through opening 15 and draining through the valve assembly 10. Thus, the valve spring 22 functions to hold the valve 20 in a normally closed position.

With reference to FIG. 3, the opening action of the valve will now be described. The valve 20 is forcibly urged to an open position by directing an upward force on the lower portion 48 of the valve stem 46 along directional line 74. The retaining pin 52 in the valve stem 46 will force the retaining member 24 to slide upwardly with the valve 20 against the counter-acting biasing force of the spring 22 as the sealing ring 40 of the valve 20 is moved off of and away from the valve seat 25. To maintain the valve 20 in the open position, a constant upward force against the lower portion 48 of the valve stem 46 must be applied. Any tool adapted to securely engage the lower portion 48 of the valve stem 46 may be used to apply the upward pressure to the stem 46.

When the valve 20 is slidably moved and held to the open position, liquid from the container 12 will flow through the opening 15 in the sloped bottom structure 14 and through the annular opening created between the angled seat 25 of the inner sleeve 19 and the sealing ring 40 of the valve shoulder 36. The liquid contents of the container 12 will then flow downwardly through the housing 18, through the openings 55 in the retaining member 24, and will then exit the housing 18. The present invention thus eliminates the need for a sump when draining the container 12.

In FIG. 4 the annular shape of the valve 20 and the circumferential arrangement of the fins 42 about the upper portion 44 of the valve stem 46 can be seen more clearly. From FIG. 4 it can also be seen how the fins 42 help to hold the valve 20 concentrically within the inner sleeve 19 of the housing 18.

FIG. 5 shows more clearly the openings 55 in the retaining member 24 which allow the liquid contents of the container 12 to pass therethrough and exit the valve assembly 10. The annular opening 50 for receiving the lower end 48 of the valve stem 46 can also be seen more clearly.

The present invention is well calculated to provide a relatively low cost and easily constructed valve assembly for use in connection with liquid bulk containers. The valve assembly 10 further provides a simple and quick opening and closing movement for quickly, easily and controllably discharging the contents of a liquid bulk container. In addition, the valve assembly 10 is operable to be quickly and easily disassembled for periodic cleaning.

It should be appreciated that although the present invention has been described in connection with specific examples thereof, modifications may be made to the present invention by those skilled in the art without departing from the fair and true scope of the following claims.

What is claimed is:

1. A dry break discharge assembly comprising:
   a valve member having a stem;
   a housing for said valve member, said housing having a seat at its upper end engageable with said valve member to define a closed position for said valve member preventing liquid flow through said housing;
   biasing means engaged with said valve member and operable to bias said valve member in one direction toward said seat, said stem being movable in a direction opposite to said one direction to move said valve member away from said valve seat to define an open position in which said valve member is spaced from said seat, and
   a plurality of outwardly protruding fins on said stem slidably engaged with said housing in both said open and closed positions of said valve member, said plurality of fins being adjacent said seat, and said fins being operable to maintain said valve concentrically within said housing and in a concentric relation with said seat when said valve is moved between said open position and said closed position.

2. In a liquid bulk container, a dry-break discharge valve assembly comprising:
   an annular valve housing having first and second ends, said valve housing further having an upper inner wall and a lower, recessed inner wall, said recessed inner wall forming an internal shoulder portion in between said first and second ends, said upper inner wall further having an angled seat portion at said first end;
   a valve disposed within said valve housing and having a head portion, said valve having an annular sealing ring disposed thereon at said head portion, said sealing ring being engageable with said angled seat portion of said valve housing when said valve is in a closed position, said valve further having an elongated stem formed with said head portion, said stem being operable to receive a force thereon to allow manual upward movement of said valve off of said angled seat portion, thereby placing said valve in an open position to allow a flow of liquid between said angled seat portion and said sealing ring, said valve further having a plurality of outwardly protruding, elongated fins formed below said head, said fins being operable to maintain said valve concentrically within said valve housing when said valve is moved to said open position;
   a spring retaining member secured to said stem, said retaining member being adapted to fit nestably within said lower recessed portion of said valve housing, said spring retaining member being operable to slide within said recessed inner wall when said valve is moved between said open and closed positions; and
   a spring nested within said recessed inner wall of said valve housing, said spring being disposed between said spring retaining member and said shoulder portion of said recessed inner wall, said spring being operable to provide a biasing force to move and hold said valve in said closed position when said force being received by said stem is removed, thereby preventing a flow of liquid through said valve housing.

3. The valve assembly of claim 2, further including an inner sleeve member removably mounted in said valve housing and forming said inner wall and said shoulder, said retaining member being operable to support said sleeve member on said housing and upon removal enabling removal of said sleeve member, valve and spring from said housing.

* * * * *